Feb. 4, 1964  F. E. SMITH  3,120,280
MECHANICAL COTTON CHOPPER
Filed Jan. 2, 1963  3 Sheets-Sheet 1
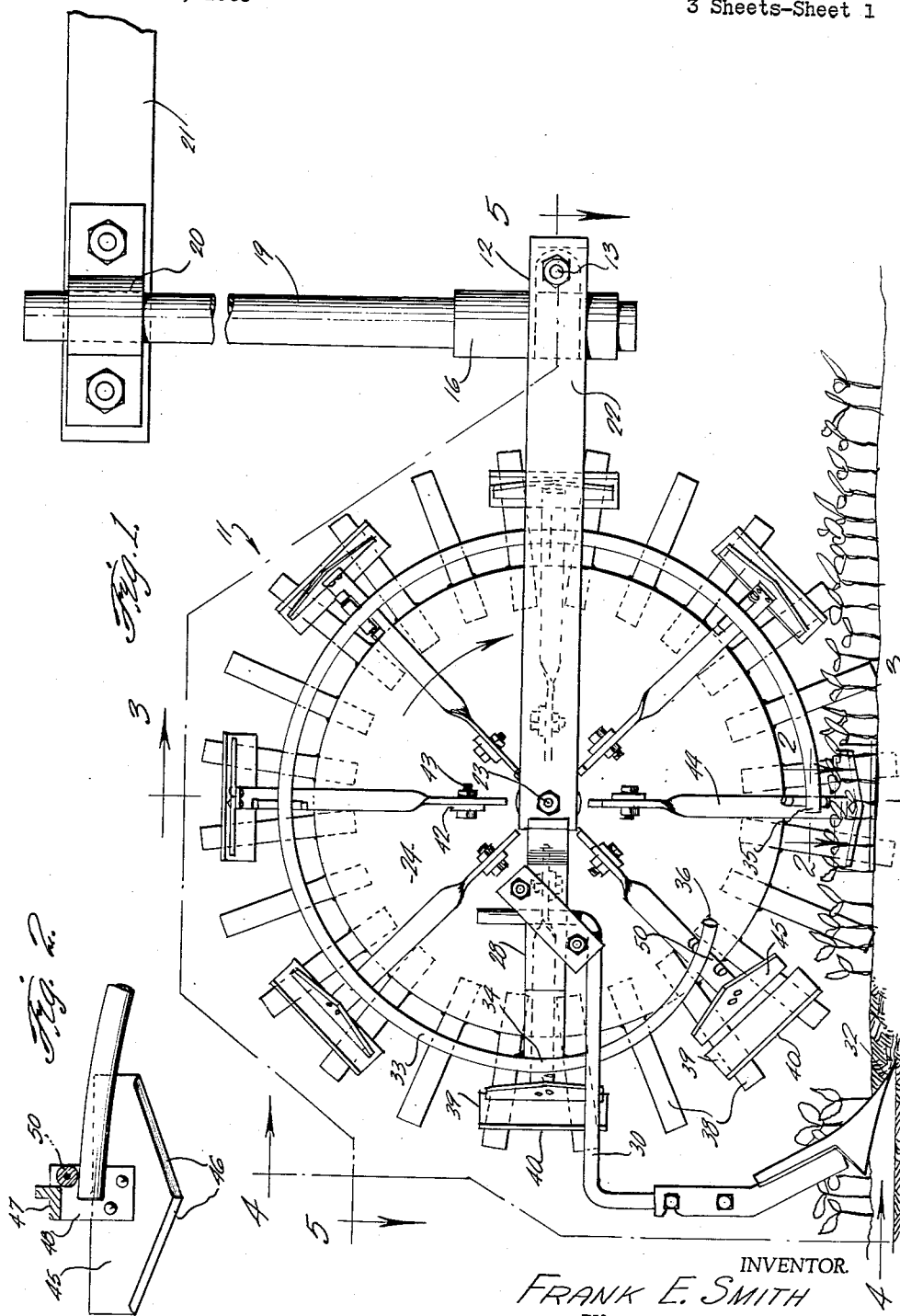
INVENTOR.
FRANK E. SMITH
BY
McMorrow, Berman & Davidson
Attorneys

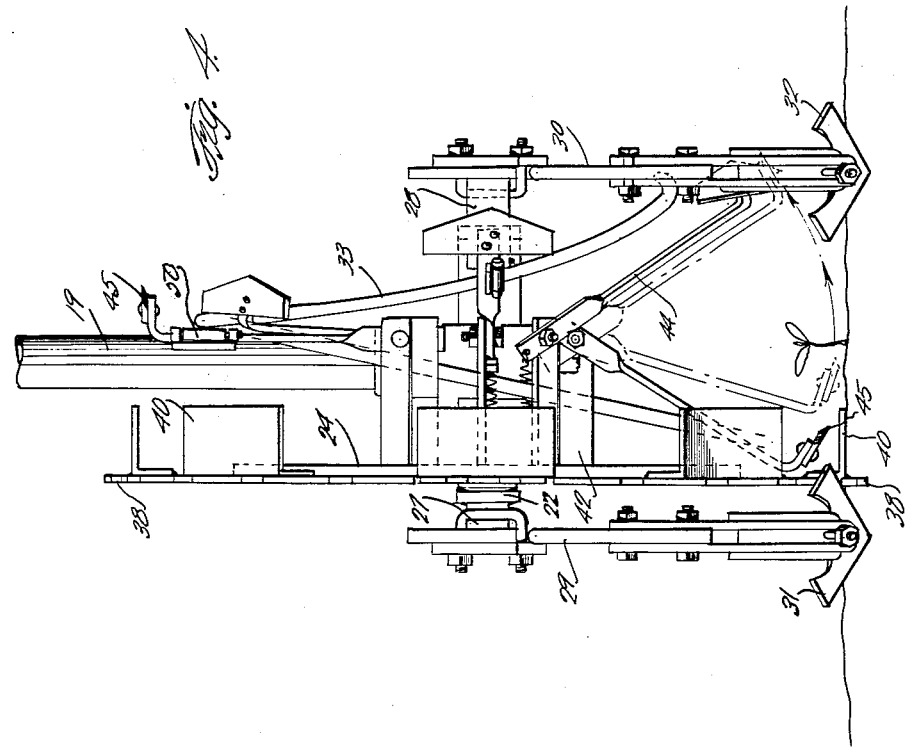
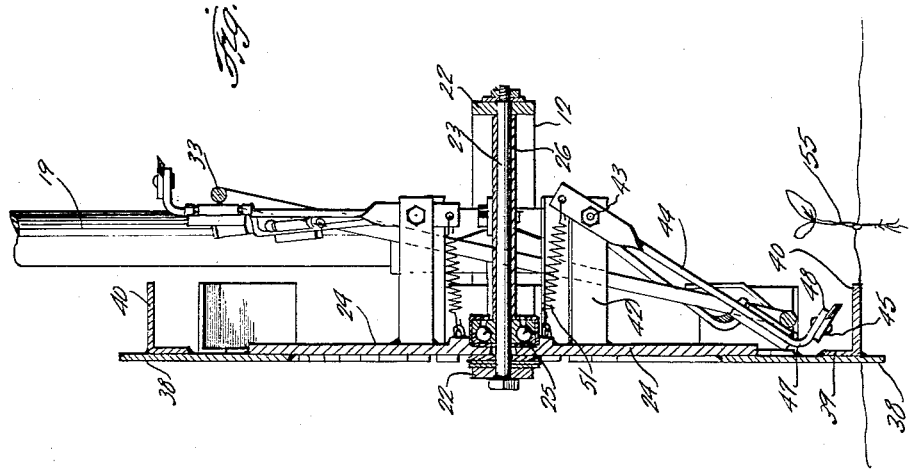

Feb. 4, 1964 F. E. SMITH 3,120,280
MECHANICAL COTTON CHOPPER
Filed Jan. 2, 1963 3 Sheets-Sheet 3
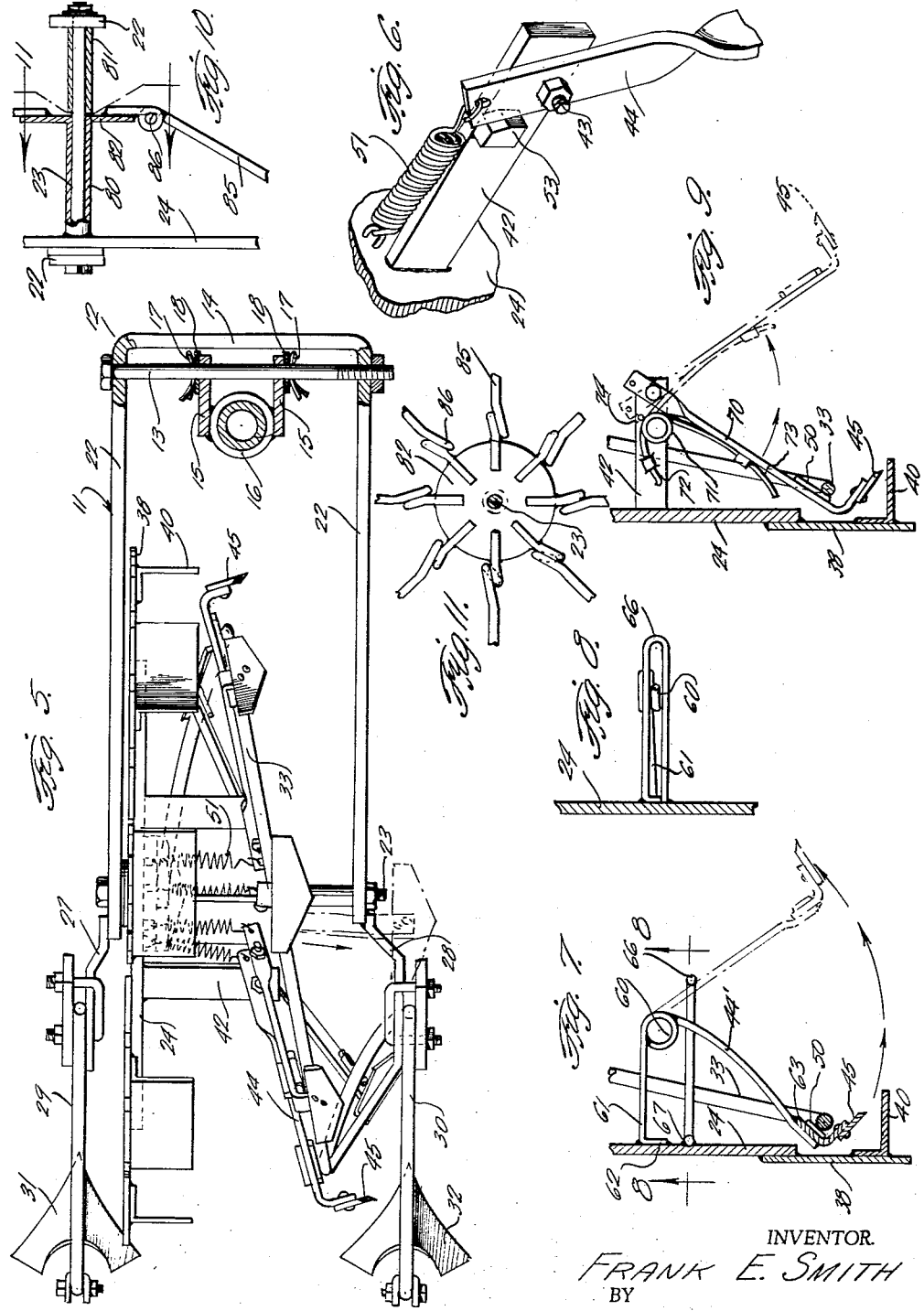
INVENTOR.
FRANK E. SMITH
BY
McMorrow, Berman & Davidson
Attorneys United States Patent Office 3,120,280
Patented Feb. 4, 1964

3,120,280
MECHANICAL COTTON CHOPPER
Frank E. Smith, La Feria, Tex.
Filed Jan. 2, 1963, Ser. No. 248,941
6 Claims. (Cl. 172—157)

This invention relates to agricultural equipment, and more particularly to a mechanical chopper to thin plants which have been planted in drills or rows to the proper thickness or number on the ground.

The main object of the invention is to provide a novel and improved mechanical chopper adapted to be employed for thinning plants, such as cotton, tomatoes, corn, or the like, the mechanical chopper being relatively simple in construction, providing uniform and accurate thinning, and simultaneously performing cultivating operations along with the thinning operations thereof.

A further object of the invention is to provide an improved mechanical chopper for use in thinning plants which have been planted in drills or rows, the mechanical chopper being relatively inexpensive to manufacture, being economical to operate, providing a great saving in human labor, and being operable efficiently on different levels and on uneven terrain.

Further objects and advantages of the invention will become apparent from the following description and claims, and from the accompanying drawings, wherein:

FIGURE 1 is a side elevational view of an improved mechanical chopper constructed in accordance with the present invention, shown attached to the frame of a pulling vehicle.

FIGURE 2 is an enlarged fragmentary horizontal cross sectional view taken substantially on the line 2—2 of FIGURE 1.

FIGURE 3 is a transverse vertical cross sectional view taken substantially on the line 3—3 of FIGURE 1.

FIGURE 4 is an elevational view taken substantially on the line 4—4 of FIGURE 1.

FIGURE 5 is a top plan view of the mechanical chopper, partly in horizontal cross section, taken substantially on the line 5—5 of FIGURE 1.

FIGURE 6 is an enlarged perspective view showing the pivotal connection of one of the chopper arms of the machine of FIGURES 1 to 5, with its associated biasing spring and stop means.

FIGURE 7 is a fragmentary enlarged transverse vertical cross sectional view taken through a portion of the present invention, showing an alternative swinging support and biasing spring arrangement for the chopper arms of the machine.

FIGURE 8 is a cross sectional view taken substantially on the line 8—8 of FIGURE 7.

FIGURE 9 is a fragmentary transverse vertical cross sectional view, similar to FIGURE 7, but showing a further modified form of the machine.

FIGURE 10 is a fragmentary transverse vertical cross sectional view similar to FIGURES 7 and 9, showing a still further modified form of the machine.

FIGURE 11 is a fragmentary transverse vertical cross sectional view taken substantially on the line 11—11 of FIGURE 10.

Referring to the drawings, and more particularly to FIGURES 1 to 6, 11 generally designates an improved mechanical chopper constructed in accordance with the present invention. The chopper 11 comprises a generally U-shaped main frame 12 provided with means for attaching the bight portion thereof to the frame of a suitable pulling vehicle, such as a tractor or a cultivator. Thus, a transverse bolt 13 is engaged through the side arms of the frame member 12 parallel to and adjacent to the transversely extending bight portion 14 thereof, and pivotally mounted on the intermediate portion of the bolt 13 are the spaced bracket plates 15, 15 between which is welded an upstanding sleeve 16. The bracket plates 15, 15 are retained on the intermediate portion of the bolt 13 by the provision of a pair of cotter pins 17, 17 engaged through apertures provided on the bolt outwardly adjacent to the respective plates 15, 15, thus holding the plates against endwise movement away from the positions thereof shown in FIGURE 5. Suitable washers 18, 18 are provided between the cotter pins 17 and the plates 15, as shown in FIGURE 5.

Secured in the sleeve 16 is an upstanding tubular hitch bar 19 which extends through a hitch loop 20 provided on the rearwardly extending hitching bar 21 of a tractor, cultivator, or other suitable pulling vehicle.

Extending transversely through and secured to the rear portions of the side arms 22, 22 of the frame member 12 is a bolt 23 on which is journaled a rigid wheel or disc member 24, a ball bearing assembly 25 being provided to rotatably support the disc 24 on the shaft 23, as shown in FIGURE 3, the disc 24 being located adjacent to one of the side arms 22. A spacer sleeve 26 is provided on the bolt 23 between the ball bearing unit 25 and the opposite side arms 22 of the frame member 12.

Rigidly secured to the rear end portions of the side arms 22, 22 are respective rearwardly extending outwardly offset bracket bars 27 and 28 to which are secured respective generally V-shaped cultivator-supporting rods 29 and 30, said supporting rods being provided with depending vertical rear end portions to which are secured the respective cultivator blades 31 and 32. Designated at 33 is a helically curved cam rod which is rigidly secured, as by welding or the like, at 34, to the rear end edge of the bracket bar 28 and which is thus supported coaxially with the axle bolt 23 outwardly of the disc member 24, the rod 33 comprising slightly less than one full turn with the lowermost end thereof, shown at 35, located substantially in vertical alignment with the axle bolt 23, the cam rod curving arcuately around the bolt and sloping outwardly proceeding in a counterclockwise direction around said bolt, as viewed in FIGURE 1, the opposite terminal end of the cam rod, shown at 36, being therefore spaced outwardly a substantial distance from the longitudinal vertical plane of the other end 35 of the cam rod. As shown in FIGURE 1, the terminal end 36 is angularly spaced from the opposite end 35 of the cam rod by a substantial angle, for example, by an angle of the order of 30°, representing the release angle for the chopper arms of the machine.

Rigidly secured to the peripheral portion of the disc member 24 are the uniformly spaced outwardly projecting ground-engaging teeth 38. Secured on uniformly spaced pairs of adjacent teeth 38 are respective right angled tread bars 39 having plate-like ground-engaging tread plate elements 40 which limit penetration of the teeth 38 into the ground in the manner illustrated in FIGURES 3 and 4.

Rigidly secured to the disc member 24 substantially in radial alignment with the respective tread bars 39 are outwardly projecting chopper arm supporting bars 42, each bar 42 being substantially in a plane perpendicular to the plane of the tread element 40 of its associated right angled tread bar 39. Pivotally connected at 43 to the outer end portion of each supporting bar 42 is a chopper arm 44 provided at its outer end with a transversely extending blade 45 having the convergent cutting edges 46, 46, as shown in FIGURE 2. As shown in FIGURES 3 and 4, the arms 42 are provided at their outer ends with the right angled bends 47, the blades 45 being secured on the outwardly extending portions 48 of said right angled bends. Journaled on each chopper arm 42 adjacent its right angled bend 47 is a longitudinal roller 50 which is located so as to engage with the helically curved cam rod 33. A coiled spring 51 connects the inner end of each chopper arm 44 to the adjacent portion of the disc member 24, biasing the elongated main portions of the chopper arms 44 outwardly, namely, in a counter-clockwise direction, as viewed in FIGURE 3. The rollers 50 engage against the inner surface portion of the cam rod 33, retaining the chopper arms 44 inwardly of the cam rod until the chopper arms are released by rotating clockwise, as viewed in FIGURE 1, past the inner lower end portion 35 of the cam rod, namely, by moving into the cam rod release region.

A stop lug 53 is provided on each supporting bar 42, located so as to be engageable by the top end portion of the associated chopper arm 44 to limit the outward rotation of the chopper arm, as illustrated in FIGURE 6. The lugs 53 limit the outward swinging movement of the cam rods to positions wherein the rollers 50 of the associated cam rods will engage inwardly of the outer end portion 36 of the cam rod with continued rotation of the disc member 24 in a clockwise direction, as viewed in FIGURE 1.

As shown in FIGURES 1, 3 and 4, in their inward positions the blades 45 will be located above and relatively close to the associated tread elements 40 and will be thus located in the proper positions for severing the stalks of plants 55 to be thinned when the chopper arms are released to be swung outwardly by the action of their associated springs 51.

In operation, as the device is moved forwardly with its associated pulling vehicle, the teeth 38 engage in the soil, the depth of engagement thereof being limited by the associated tread elements 40 thereof, as above described. The engagement of the exposed end portions of the teeth 38 in the ground causes the disc member 24 to be rotated. Thus, forward movement of the pulling vehicle will cause the disc member 24 to be rotated in a clockwise direction, as viewed in FIGURE 1. The pulling vehicle moves the attachment along a row of plants to be thinned, the teeth 38 engaging in the soil laterally of the row and spaced therefrom at a distance such that outward swinging movement of the chopper arms will cause their blades 45 to engage the stalks of the plants 55 to be thinned at the proper height to efficiently sever said stalks. Thus, as the disc 24 rotates clockwise with the forward movement of the attachment the arms 44 will be sequentially released from the inner end portion of the cam rod 33, being previously held against the cam rod by the biasing action of their coil springs 51, whereby the arms 44 rapidly swing outwardly upon their release. The sudden rapid outward movement of the arms, produced by the contraction of their biasing springs 51 causes the cutting edges 46 of the blades 45 to sever the stalks of the plants 55, thus producing the desired thinning action. With continued rotation of the disc 24 the rollers 50 of the arms come into engagement with the cam rod 33 adjacent the end portion 36 thereof, whereby the arms are again engaged with the inside surface of the cam rod, causing the arms to be retracted with continued rotation of the disc 24 and tensing their springs 51. The arms are properly positioned for engagement with the inside surface of the rod 33 adjacent the end 36 of the cam rod by the associated stop elements 53 which limit the outward swinging movement of the chopper arms in the manner above described.

Simultaneously with the thinning action, the cultivator blades 31 and 32 penetrate into the soil adjacent the row of plants being thinned providing a cultivating action simultaneously with the thinning action, which is very important in promoting the further growth of the plants remaining after the thinning operation.

As will be readily apparent, the mechanical chopper above described provides a very uniform thinning operation because of the uniform release angle defined between the ends 35 and 36 of the helical cam rod 33.

Referring now to FIGURES 7 and 8, a modified form of chopper arm is disclosed, the arm being designated generally at 44' and comprising a resilient wire rod formed with a spring coil 60 at its intermediate portion and with a relatively rigid leg 61 which is welded at 62 to the disc member 24. An angle bracket 63 is welded to the free end portion of the spring arm 44', the blade 45 being mounted on the outwardly projecting arm of the angle bracket 63 and the guide roller 50 being journaled on the portion of the angle bracket welded to the free end of the spring rod 44', said roller 50 being engageable with the cam rod 33 in the same manner as described in connection with the previously disclosed form of the invention. Outward swinging movement of the free end portion of the spring rod 44' is limited by the provision of an outwardly elongated stop loop 66 which encloses the free end portion of the spring rod 44', the inner end of the stop loop 66 being welded at 67 to the disc member 24. The loop 66 is elongated and extends parallel to the fixed arm 61, being of sufficient length to allow the required outward swinging movement of the free arm of the spring member 44'.

The operation of the embodiment illustrated in FIGURES 7 and 8 is substantially the same as that of the previously described form of the invention, the free end portion of the spring member 44' being released for outward swinging movement when its roller 50 passes the lower inner end portion 35 of the cam rod 33, outward swinging movement being limited by the engagement with the outer end of the loop 66, said outer end being so positioned as to locate the roller 15 in proper position for engagement within the cam rod 33 adjacent the end 36 thereof with continued rotation of the disc 24.

Referring now to the form of the invention shown in FIGURE 9, each chopper arm, shown at 70, is provided with a guide roller 50, as in the previously described forms of the invention, the guide roller being located so as to engage with the inside surface of the helical cam rod 33. A coiled spring 71 biases the main portion of each chopper arm 70 outwardly, the coiled spring having one end 72 thereof secured to the associated chopper arm supporting bar 42 and having its other end 73 secured to the chopper arm 70 in the manner clearly illustrated in FIGURE 9, biasing the chopper arm in a counterclockwise direction, as viewed in FIGURE 9. The spring 71 therefore acts in the same manner as the coiled spring 51 in the form of the invention of FIGURES 1 to 6, swinging the chopper arm 70 outwardly when it is released from the cam rod 33 at the end portion 35 of the cam rod. A stop lug 74 is provided on the associated supporting bar 42, limiting the outward swinging movement of the chopper arm 70 to a position wherein its roller 50 will engage inwardly of the portion of cam rod 33 adjacent the end 36 thereof with continued rotation of the disc member 24.

In the form of the invention shown in FIGURES 10 and 11, the disc member 24 is provided with a sleeve-like hub 80 which is rotatably supported on the axle bolt 23, a spacer sleeve 81 being provided on the outer portion of the bolt between a circular flange 82 formed on the outer end of the hub 80 and the adjacent frame arm 22. Uniformly spaced resilient chopper arms 85 are secured on the circular flange 82, each chopper arm 85 being formed with an integral spring coil 86, the arms 85 being formed of resilient wire stock, so that the coils 86 act in the same manner as the previously described springs to bias the chopper arms 85 outwardly. The arms 85 are engageable wtih the inside surface of the helically curved cam rod 33 to control the swinging movements of the arms in the same manner as in the case of the previously described forms of the invention.

While certain specific embodiments of an improved plant thinning apparatus especially adapted for use in thinning cotton, tomatoes, corn and other plants have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A plant thinning apparatus comprising a frame, means to attach said frame to a pulling vehicle, a ground-engaging wheel journaled to said frame, a helical cam rod secured to said frame substantially coaxially with said wheel, said cam rod being located adjacent the periphery of the wheel and having a circumferential length less than one complete turn by a relatively small angle, whereby to provide an open portion, the ends of the cam rod being located adjacent the lower peripheral portion of said wheel, one end being located relatively close to the plane of said wheel and the other end being spaced a substantial distance outwardly from said plane, a plurality of chopper arms swingably mounted on said wheel, outwardly directed cutting blades on the free ends of the arms, and resilient means biasing the free ends of the arms outwardly, the portions of the arms adjacent the cutting blades engaging the inside surface of said cam rod as the wheel rotates and being intermittently released adjacent the lower peripheral portion of the wheel by reaching the open end portion of the cam rod.

2. A plant thinning apparatus comprising a frame, means to attach said frame to a pulling vehicle, a ground-engaging wheel journaled to said frame, a helical cam rod secured to said frame substantially coaxially with said wheel, said cam rod being located adjacent the periphery of the wheel and having a circumferential length less than one complete turn by a relatively small angle, whereby to provide an open portion, the ends of the cam rod being located adjacent the lower peripheral portion of said wheel, one end being located relatively close to the plane of said wheel and the other end being spaced a substantial distance outwardly from said plane, a plurality of chopper arms swingably mounted on said wheel, outwardly directed cutting blades on the free ends of the arms, resilient means biasing said free ends of the arms outwardly, the portions of the arms adjacent the cutting blades engaging the inside surface of said cam rod as the wheel rotates and being intermittently released adjacent the lower peripheral portion of the wheel by reaching the open portion of the cam rod, and stop means fixed relative to said wheel and being engageable by said arms to limit outward swinging movements of said free ends of the arms, said stop means being located to substantially maintain said arms inwardly of the longitudinal vertical plane of said other end of the cam rod.

3. A plant thinning apparatus comprising a frame, means to attach said frame to a pulling vehicle, a ground-engaging wheel journaled to said frame, a helical cam rod secured to said frame substantially coaxially with said wheel, said cam rod being located adjacent the periphery of the wheel and having a circumferential length less than one complete turn by a relatively small angle, whereby to provide an open portion, the ends of the cam rod being located adjacent the lower peripheral portion of said wheel, one end being located relatively close to the plane of said wheel and the other end being spaced a substantial distance outwardly from said plane, a plurality of chopper arms swingably mounted on said wheel, outwardly directed cutting blades on the free ends of the arms, resilient means biasing said free ends of the arms outwardly, the portions of the arms adjacent the cutting blades engaging the inside surface of said cam rod as the wheel rotates and being intermittently released adjacent the lower peripheral portion of the wheel by reaching the open portion of the cam rod, stop means fixed relatively to said wheel and being engageable by said arms to limit outward swinging movement of said free ends of the arms, said stop means being located to substantially maintain said arms inwardly of the longitudinal vertical plane of said other end of the cam rod, and at least one cultivating blade secured to said frame and located rearwardly of said open portion of the cam rod and being engageable in the ground rearwardly of the outwardly swinging chopper arms.

4. A plant thinning apparatus comprising a frame, means to attach said frame to a pulling vehicle, a ground-engaging wheel journaled to said frame, uniformly spaced ground-penetrating teeth on the periphery of said wheel, plate-like tread members secured transversely to spaced pairs of said teeth and extending in planes perpendicular to the plane of the wheel, a helical cam rod secured to said frame substantially coaxially with said wheel, said cam rod being located adjacent the periphery of the wheel and having a circumferential length less than one complete turn by a relatively small angle, whereby to provide an open portion, the ends of the cam rod being located adjacent the lower peripheral portion of said wheel, one end being located relatively close the plane of said wheel and the other end being spaced a substantial distance outwardly from said plane, a plurality of chopper arms swingably mounted on said wheel, the chopper arms being substantially in radial alignment with said tread members, outwardly directed cutting blades on the free ends of the arms, and resilient means biasing said free ends of the arms outwardly, the portions of the arms adjacent the cutting blades engaging the inside surface of said cam rod as the wheel rotates and being intermittently released adjacent the lower peripheral portion of the wheel by reaching the open portion of the cam rod.

5. A plant thinning apparatus comprising a frame, means to attach said frame to a pulling vehicle, a ground-engaging wheel journaled to said frame, uniformly spaced ground-penetrating teeth on the periphery of said wheel, plate-like tread members secured transversely to spaced pairs of said teeth and extending in planes perpendicular to the plane of the wheel, a helical cam rod secured to said frame substantially coaxially with said wheel, said cam rod being located adjacent the periphery of the wheel and having a circumferential length less than one complete turn by a relatively small angle, whereby to provide an open portion, the ends of the cam rod being located adjacent the lower peripheral portion of said wheel, one end being located relatively close to the plane of said wheel and the other end being spaced a substantial distance outwardly from said plane, a plurality of chopper arms swingably mounted on said wheel, the chopper arms being substantially in radial alignment with said tread members, outwardly directed cutting blades on the free ends of the arms, resilient means biasing said free ends of the arms outwardly, the portions of the arms adjacent the cutting blades engaging the inside surface of said cam rod as the wheel rotates and being intermittently released adjacent the lower peripheral portion of the wheel by reaching the open portion of the cam rod, stop means fixed relative to said wheel and being engageable by said arms to limit outward swinging movement of said free ends of the arms, said stop means being located to substantially maintain said arms inwardly of the longitudinal vertical plane of said other end of the cam rod, and at least one cultivating blade secured to said frame and located rearwardly of said open portion of the cam rod and being engageable in the ground rearwardly of the outwardly swinging chopper arms.

6. A plant thinning apparatus comprising a frame, means to attach said frame to a pulling vehicle, a ground-engaging wheel journaled to said frame, uniformly spaced ground-penetrating teeth on the periphery of said wheel, plate-like tread members secured transversely to spaced pairs of said teeth and extending in planes perpendicular to the plane of the wheel, a helical cam rod secured to said frame substantially coaxially with said wheel, said cam rod being located adjacent the periphery of the wheel and having a circumferential length less than one complete turn by a relatively small angle, whereby to provide an open portion, the ends of the cam rod being located adjacent the lower peripheral portion of said wheel, one end being located relatively close the plane of said wheel, and the other end being spaced a substantial distance outwardly from said plane, a plurality of chopper arms swingably mounted on said wheel, the chopper arms being substantially in radial alignment with said tread members, outwardly directed cutting blades on the free ends of the arms, resilient means biasing said free ends of the arms outwardly, the portions of the arms adjacent the cutting blades engaging the inside surface of said cam rod as the wheel rotates and being intermittently released adjacent the lower peripheral portion of the wheel by reaching the open portion of the cam rod, stop means fixed relative to said wheel and being engageable by said arms to limit outward swinging movement of said free ends of the arms, said stop means being located to substantially maintain said arms inwardly of the longitudinal vertical plane of said other end of the cam rod, and respective cultivating blades secured to opposite sides of said frame and being offset laterally outwardly therefrom at said opposite sides, said blades being located rearwardly of said open portion of the cam rod and being engageable in the ground rearwardly of the outwardly swinging chopper arms.

References Cited in the file of this patent

UNITED STATES PATENTS

| | | |
|---|---|---|
| 14,966 | Mann | May 27, 1856 |
| 100,128 | Dunn | Feb. 22, 1870 |
| 239,176 | Love | Mar. 22, 1881 |
| 603,271 | Gatling | May 3, 1898 |
| 635,685 | Holloway | Oct. 24, 1899 |
| 843,460 | Hurst | Feb. 5, 1907 |
| 925,475 | Hood | June 22, 1909 |
| 1,830,565 | Schaeffers | Nov. 3, 1931 |
| 2,745,331 | Lancour | May 15, 1956 |
| 2,751,831 | Null | June 26, 1956 |

FOREIGN PATENTS

| | | |
|---|---|---|
| 269,718 | Germany | Jan. 30, 1914 |
| 92,337 | Switzerland | Jan. 2, 1922 |